United States Patent [19]

Kawasaka

[11] Patent Number: 5,346,054
[45] Date of Patent: Sep. 13, 1994

[54] SUSPENDED BELT-TYPE EXPANDABLE AND MOVABLE PART HOLDER UNIT

[75] Inventor: Shozo Kawasaka, Osaka, Japan
[73] Assignee: Touhaku Co., Ltd., Tottori, Japan
[21] Appl. No.: 32,783
[22] Filed: Mar. 17, 1993

[30] Foreign Application Priority Data

May 12, 1992 [JP] Japan .................. 4-146643

[51] Int. Cl.⁵ .............................. B65G 29/00
[52] U.S. Cl. ................. 198/465.4; 198/687.1; 212/135; 212/125; 242/379.2; 242/385
[58] Field of Search ............ 198/465.4, 680, 687.1; 414/594; 104/122, 89, 93; 105/148, 150; 212/135, 125; 242/107.6

[56] References Cited

U.S. PATENT DOCUMENTS

| | | | |
|---|---|---|---|
| 807,965 | 12/1905 | Rice | 242/107.6 |
| 2,392,053 | 1/1946 | McAuliffe | 242/107.6 |
| 3,045,276 | 7/1962 | Schwarz | 242/107.6 |
| 4,202,510 | 5/1980 | Stanish | 242/107.6 X |
| 4,467,982 | 8/1984 | Tajima et al. | 242/107.6 |
| 4,708,574 | 1/1987 | Conboy et al. | |
| 4,979,860 | 12/1990 | Ueda et al. | 198/465.4 X |

FOREIGN PATENT DOCUMENTS

| | | | |
|---|---|---|---|
| 2535829 | 5/1984 | France . | |
| 62-53406 | 11/1987 | Japan . | |
| 4028606 | 1/1992 | Japan | 198/465.4 |
| 14707 | of 1889 | United Kingdom | 242/107.6 |
| 2175556 | 12/1986 | United Kingdom . | |

Primary Examiner—Cheryl L. Gastineau
Attorney, Agent, or Firm—Steven M. Rabin

[57] ABSTRACT

A belt-type part holder unit to be used in a track conveyor system of a sewing factory or the like having a large number of work stations in it in order to transfer a part from a work station to another. The unit includes a belt pulley provided in it with a ring-type spring such as a coil spring or a spiral spring so that the belt of the holder unit can be selectively held to an expanded condition or taken up by the pulley and a part of an article of dress held by the holder unit can be sewed without being taken out of the unit.

13 Claims, 8 Drawing Sheets

FIG.9

SUSPENDED BELT-TYPE EXPANDABLE AND MOVABLE PART HOLDER UNIT

TECHNICAL FIELD

This invention relates to an improved belt-type part holder unit to be used in a track conveyor system of a sewing factory or the like having a large number of work stations in it in order to transfer a part from a work station to another.

RELATED ARTS AND BACKGROUND OF THE INVENTION

A known conveyor system of the above described type installed in a sewing factory normally comprises an overhead track of rails or pipes for carrying thereon a number of wheels or rollers, from each of which a wire or rope having a hanger or hook at the lower end is suspended, said wheel, wire and hanger forming a movable holder unit. The hanger or hook is used to hold and transfer a part of an article of dress such as a jacket, coat or shirt from a work station to the next, and each work station is provided with a stopper device to halt the running conveyor system and means to release the system from the stopper and cause it to be driven manually or by motive power and move the part to the next work station.

With such a conventional conveyor system, although a relatively a long part of a long article such as that of a pair of trousers may be sewn without removing it from the hanger or hook, a relatively short part such as that of a brassiere, jacket or child's wear needs to be taken out of the hanger or hook and therefore it has to be conveyed in a basket or on a table which is held to the hanger or hook so that the operator, or sewer, may take the part out of the basket or table, sew it and then return it to the basket or table for further sewing operations at downstream work stations, consuming a considerable time to take the part out of and returning it to the basket or table.

SUMMARY OF THE INVENTION

In view of the above described problems as well as other problems of a conventional part holder unit of the type under consideration, it is therefore an object of the present invention to provide an improved part holding unit to be used in a conveyor system that allows a relatively short part of an article of dress held by it can be used without removing it from the holder, According to the present invention, the above object is achieved by providing a suspended belt-type expandable and movable part holder unit of a track conveyor system comprising a belt pulley rotatably supported by a horizontal shaft held by and between a pair of plates arranged in parallel, a belt wound around the pulley and a ring-shaped spring, such as a coil spring or spiral spring disposed in the pulley, the pulley having a pair of flanges, one of the flanges being a ratchet, a swingable pawl to be engaged with the ratchet being pivoted to one of the plates, the one plate being further provided with a swingable release means for releasing the engagement of the ratchet and the pawl.

A suspended belt-type expandable and movable part holder unit according to the invention can be used to transfer a part of an article of dress in a track conveyor system of any known type when it is suspended from a wheel running on the track of the system.

Under normal conditions, a part of an article of dress is held to a relatively high position by a holder disposed at the free end of the belt because the belt is wound up around the belt pulley by the resilient force of the ring-shaped spring. When the unit is moved to a work station and the belt which is carrying the part is pulled down by the operator, at the work station as much as he or she wants, against the resilient force of the spring, the belt is not wound back if the operator releases his or her hand from the belt, because the belt pulley is prevented from turning back by the engagement of the ratchet and the swingable pawl.

Thus, the operator can perform a sewing operation without taking the part out of the holder unit.

After completion of the sewing operation, the part of an article of dress can be automatically moved up to a high position and made ready for moving to a downstream work station as the operator releases the engagement of the ratchet and the pawl by using the release means and allows the belt pulley to take up the belt by the resilient force of the spring.

PREFERRED EMBODIMENTS OF THE INVENTION

Now, the present invention will be described in greater detail by referring to the accompanying drawings that illustrate preferred embodiments of the invention.

Figure 1:
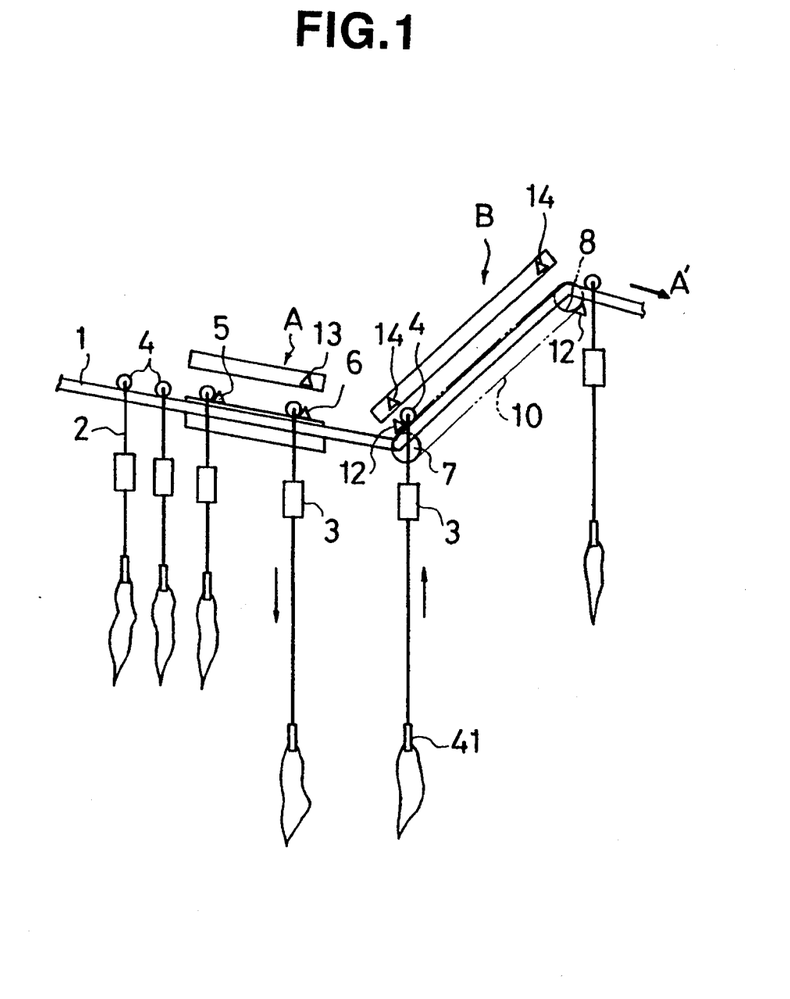
FIG. 1 is a schematic perspective view of a track conveyor system provided with suspended belt-type expandable and movable part holder units according to the invention.

Referring firstly to FIG. 1 illustrating a first embodiment of the invention, reference numeral 1 denotes a track of rails or pipes carrying a number of movable holder control devices 3, each of which is suspended from the track by way of a wheel 4 and a wire 2, the wire 2 being provided at its lower end with a hook or similar holding means, the wire 2, control device 3, wheel 4 and hanger constituting a movable holder unit.

Reference sign A in FIG. 1 denotes a work station which is provided with a first stopper 5 for halting a movable holder unit and a second stopper 6 for blocking the wheel 4 of the movable holder unit. As shown above the stopper 6 in FIG. 1, the work station is also provided with a limit switch 13, which, upon detecting a movable holder unit arriving at a given point on the track, starts driving a sewing machine assigned to the work station to operate.

Reference sign B in FIG. 1 denotes a lift station for lifting the movable holder unit by a given height along a slope and forwarding it to the next work station A' after finishing a work at the work station A. The lift station B comprises, at a low position, a pair of gear units 7, 8, a chain 10 disposed over the gear units and a pair of hooks 12, 12 fitted to respective specific points of the chain 10, as well as a pair of limit switches 14, 14 disposed at a high position, which, upon detecting a movable holder unit start or stop driving the respective gears 7, 8, to operate.

Figure 2:
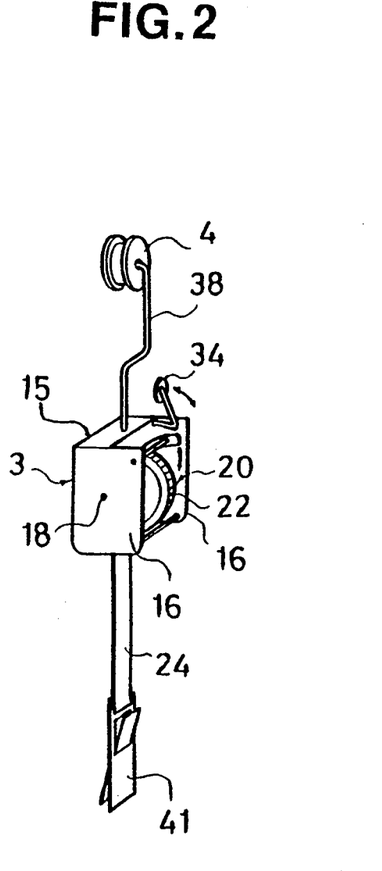
FIG. 2 is a schematic perspective view of a first embodiment of suspended belt-type expandable and movable part holder unit of the invention.
Figure 3:
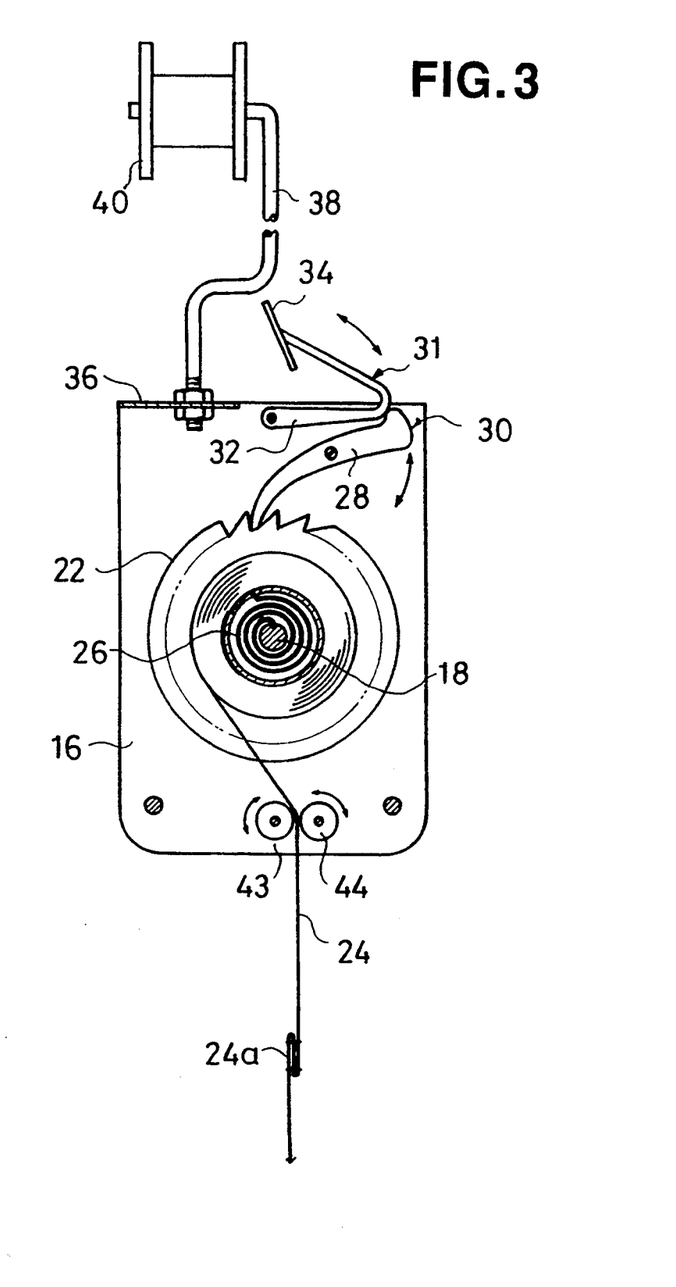
FIG. 3 is a longitudinal lateral sectional view of the embodiment of FIG. 2.
Figure 4:
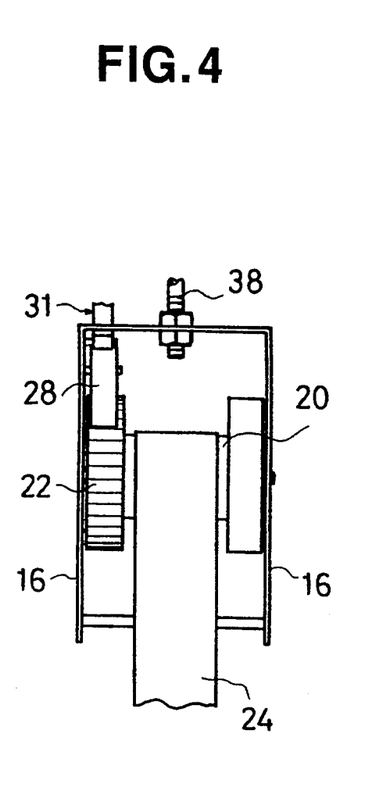
FIG. 4 is a longitudinal sectional front view of the embodiment of FIG. 2.

FIGS. 2 through 4 illustrate in greater detail the first embodiment of the suspended belt-type expandable and movable part holder unit of the present invention. The embodiment comprises a housing 15 including a pair of vertical plates 16, 16 held in parallel with a given distance therebetween, a belt pulley 20 provided with flanges and fitted to a shaft 18 supported by the vertical plates 16, 16 and a belt 24 wound around the belt pulley 20. One of the flanges of the belt pulley 20 is toothed at the outer peripheral surface to make a ratchet 22. A coil spring, a spiral spring 26 or other ring-type spring is disposed in the belt pulley 20 with its opposite ends secured respectively to the shaft 18 and the inner peripheral surface of the belt pulley 20. The ratchet 22 is locked when a pawl 28 is engaged with the ratchet 22. The pawl 28 has a sharp and slender tip and is swingably pivoted so that the tip comes into engagement with a teeth of the ratchet 22 by its own weight. The other end 30 of the pawl 28 extends beyond the pivot, or fulcrum, of the pawl 28.

The end 30 of the pawl 28 in fact abuts a release means 31, which release means 31 comprises a sharply bent rod 32 pivotally connected at an end thereof to one of the vertical plates 16, and a disc 34 secured to the other end of the rod 32.

A horizontal plate 36 connects the two vertical plates 16, 16 at the top thereof and a rod 38 is secured to the horizontal plate 36 somewhere at the center of the plate 36 by appropriate means such as nuts and extends upward. The rod 38 is rectangularly bent three times, once outwardly at the middle, then upwardly and finally inwardly, and the upper end of the rod 38 which is horizontal is rotatably fitted to a wheel 40. The free end of the belt 24 is provided with a holding means 41 such as a clip, hanger or hook for holding a workpiece such as an article of dress. A pair of idle rollers 43, 44 are arranged below the belt pulley 20 and between the vertical plates 16, 16 and the belt 24 passes therebetween. The belt 24 is provided with a folded section 24a at an appropriate position in the middle thereof where the thickness of the belt is greater than the distance between the rollers 43, 44.

Figure 5:
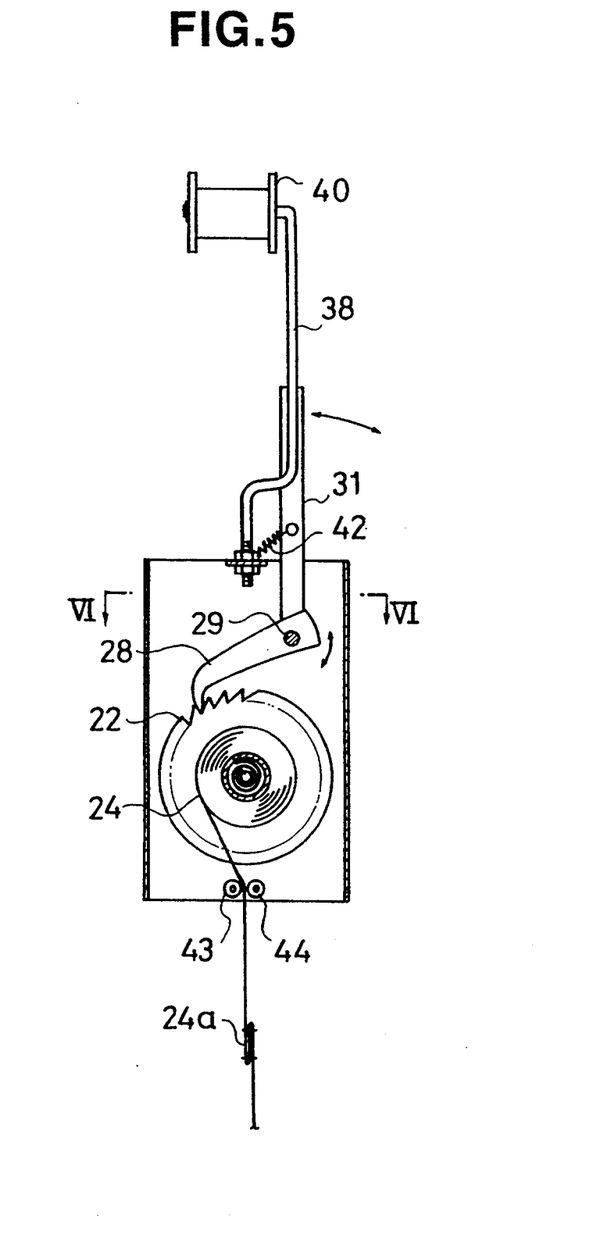
FIG. 5 is a longitudinal lateral sectional view of a second embodiment of suspended belt-type expandable and movable part holder unit of the invention.
Figure 6:
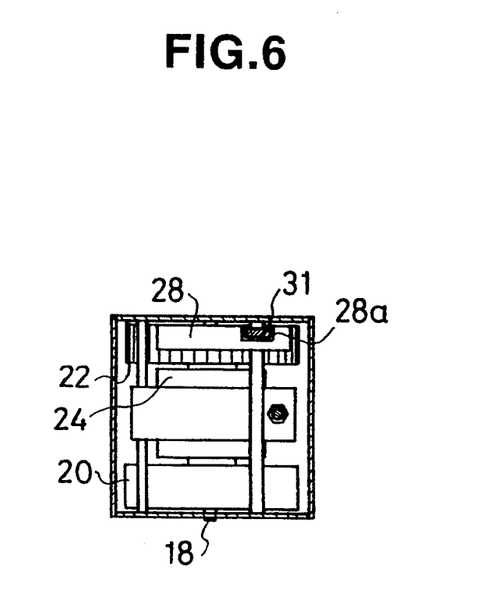
FIG. 6 is a sectional view of FIG. 5 cut along VI—VI line.
Figure 7:
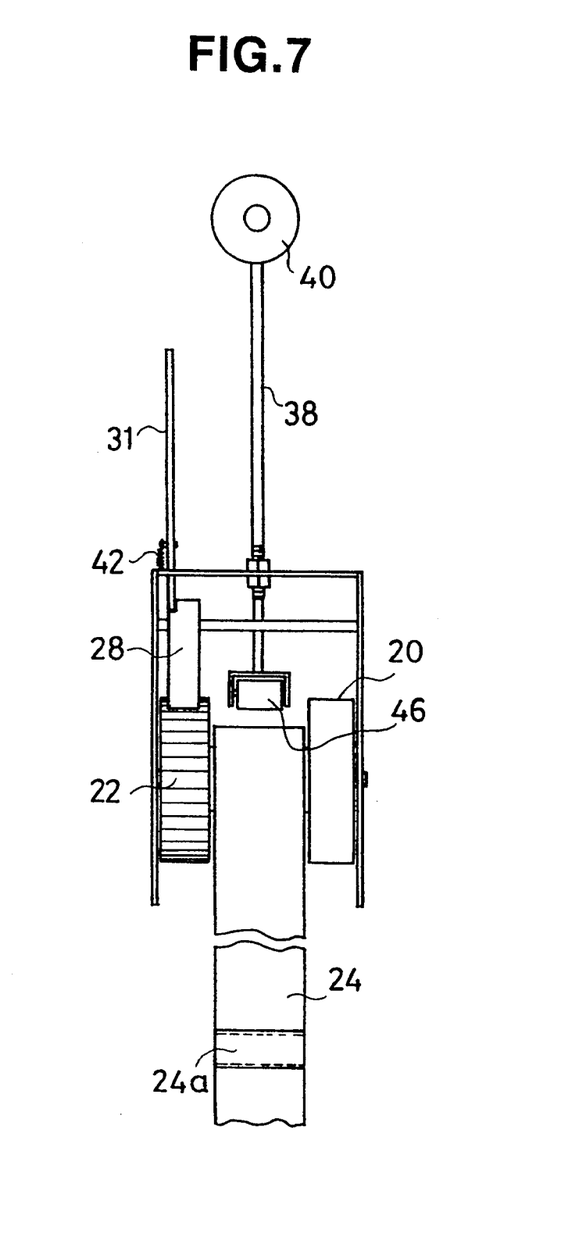
FIG. 7 is a longitudinal sectional front view of the embodiment of FIG. 5.

FIGS. 5 to 7 illustrate a second embodiment of suspended belt-type expandable holder unit of the present invention comprising a belt pulley 20, a belt 24 wound around the belt pulley 20 and a suspended idle roller 46 which comes to abut the belt 24 when it is wound up to show a given thickness (diameter) around the belt pulley 20. The suspended idle roller 46 is designed to slow and stop the motion of the pulley belt when the belt 24 is abruptly wound up to fling up a part held by the hook at the lower end of the belt 24. The pivot 29 of the pawl 28 is provided with a release means 31 typically made of a plate and longitudinally extending from the pivot 29.

As seen from FIG. 6, the pawl 28 and the release means 31 are connected to a common pivot and the pawl 28 is provided with a notch 28a which is releasably engaged with the release means 31. The release means 31 is on its part urged to rotate counterclockwise by a spring 42 connected to one of the plates 16, 16 in FIG. 5.

Figures 8, 9:
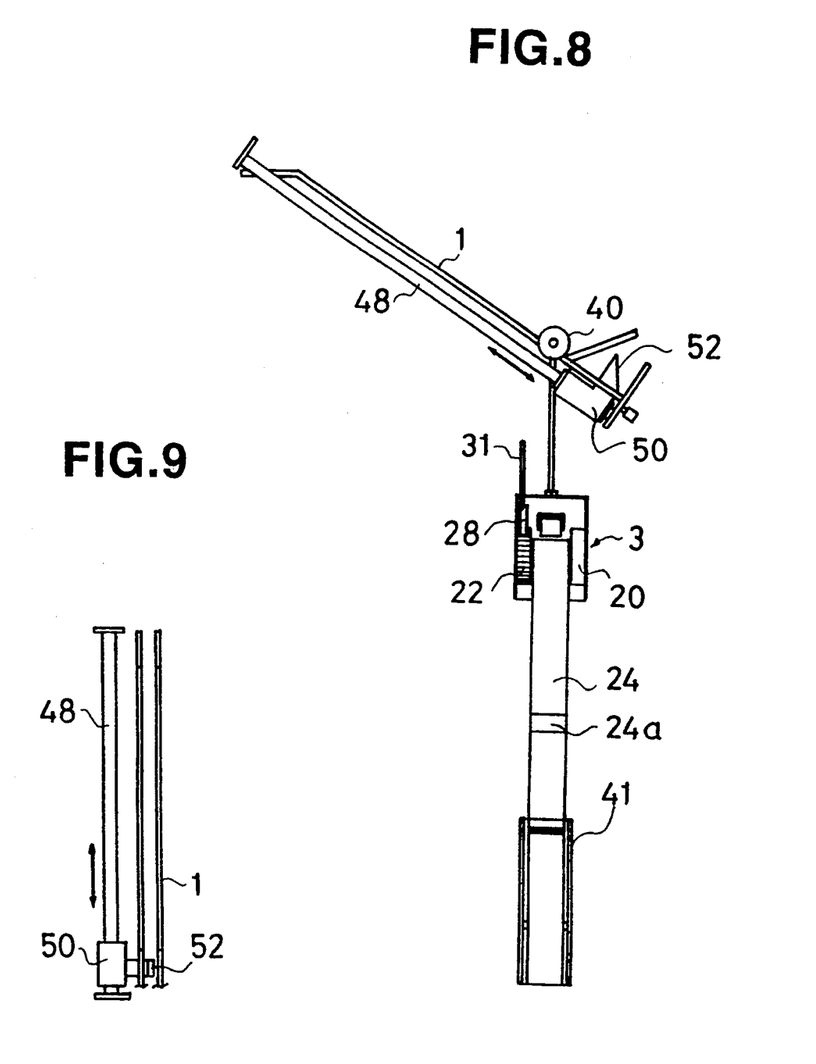
FIG. 8 is a partial sectional view of a lift station of a track conveyor system to be used for a suspended belt-type expandable and movable part holder unit according to the invention.

FIGS. 8 and 9 illustrate a lift station B to be used for the above described embodiment, the lift station B comprising a hollow rodless cylinder 48 arranged in parallel with a pair of rails 1 of the rail, a cursor 50 slidably engaged with the cylinder 48 and a triangular hook 52 projecting from the cylinder 48 through the space between the pair of rails 1 by way of the cursor 50 and a bracket so that the cursor 50 moves reciprocally as compressed air is blown into the cylinder 48 through its opposite ends.

With a conveyor system having a configuration as described above, a suspended expandable and movable belt-type part holder unit according to the invention and moving on the track 1 is temporarily halted by the stopper 5 of a work station A to determine if the unit is carrying a part to be used there or not. If it is determined that the unit is not carrying a part to be used there, the stoppers 5 and 6 are released and the suspended belt-type expandable and movable part holder unit is forwarded to the next work station. If, on the other hand, it is determined that the unit is carrying a part to be used there, the operator of the station can immediately use the part because the limit switch 13 has already detected that the unit is approaching the work station and started driving the motor of the sewing machine of the work station to operate. The operator can extend the belt 24 against the resilient force of the ring-shaped spring of the movable holder control device 3 by pulling the belt 24 down with his or her hand, but the belt 24 tends to be wound up once the operator releases his or her hand.

However, the returning motion of the belt 24 is immediately blocked as the ratchet 24 and the pawl 28 of the belt pulley 20 are engaged with each other and the belt pulley 20 becomes no longer rotatable. Then, the operator can pull the part on the hook as far as the sewing machine and carry out a predetermined sewing operation on the part.

When the sewing operation is over, the operator releases the stopper 6 either manually or by a mechanical means. Then, the suspended belt-type expandable and movable part holder unit starts moving again along the track until it gets to the next work station A'.

As the suspended belt-type expandable and movable part holder unit moves from the work station A and approaches the next lift station B, it is detected by the limit switch 14, which then drives the gears 7, 8 or the cursor 50 to operate. Then, the hooks 12, 12 pull up the wheel 4 of the suspended belt-type expandable and movable part holder unit along the steep slope of the track 1, holding the unit not to fall back, to lift the suspended belt-type expandable and movable part holder unit to a given height (the highest point in this embodiment). As the suspended belt-type expandable and movable part holder unit reaches the highest point, the limit switch 14 of the lift station senses it and stops the operation of the gears 7, 8.

Then, the release means 31 of the movable holder control device 3 is mechanically or manually made to release the belt pulley 20, which by turning takes up the extended belt 24 by the resilient force of the built-in spring.

It should be noted that belt 24 of the embodiment of FIGS. 1 and 2 has a folded section 24a in the middle and a pair of rollers 43, 44 arranged near the bottom of the movable holder control device 3 with a given distance disposed therebetween, so that the folded section 24a of the belt 24 is blocked by the rollers 43, 44 as the belt is taken up by the belt pulley 20.

Since the embodiment of FIG. 5 is provided with a suspended idle roller 46, the belt 24 being taken up by the belt pulley 20 is slowed and stopped when it comes to have a certain thickness (height) around the pulley 20 and abuts the latter.

EFFECT

As is apparent from the above description, with a suspended belt-type expandable and movable part holder unit according to the invention, a part of an article of dress, held by the holding means of the unit, such as a clip, hanger or hook, can be brought down to and sewed on a sewing machine by simply expanding the belt of the unit without taking it out of the holding means if it is relatively short and, upon completion of the sewing operation, the belt can be caused to be taken up by the unit to bring up and move the part to a next work station by the manual or mechanical releasing means of the unit.

What is claimed is:

1. A suspended belt-type expandable and movable part holder unit of a track conveyor system, comprising a belt pulley rotatably supported by a horizontal shaft held by and between a pair of plates arranged in parallel, a belt wound around said pulley, a ring-shaped spring disposed in said pulley, and means for supporting said pair of plates on a track of said system for movement of said holder unit along the track, said pulley having a pair of flanges, one of said flanges being a ratchet, a swingable pawl being pivotally connected to one of said plates for engagement with said ratchet, said one plate being further provided with a swingable release means for releasing the engagement of said ratchet and said pawl.

2. A suspended belt-type expandable and movable part holder unit according to claim 1, further comprising means, fitted to a free front end of said belt, for holding a workpiece.

3. A suspended belt-type expandable and movable part holder unit according to claim 1, wherein said swingable pawl is pivotally mounted to said plate at a middle thereof and said release means is disposed near an end of said pawl so that said release means abuts said end of said pawl and releases the engagement of said pawl and said ratchet when said release means is swung in a given direction.

4. A suspended belt-type expandable and movable part holder unit according to claim 1, wherein a pair of rollers are disposed below said belt pulley and between said plates, said belt passes between said idle rollers and said belt is provided with a folded section at the middle thereof, the thickness of said folded section of said belt being greater than the distance between said idle rollers.

5. A suspended belt-type expandable and movable part holder unit according to claim 1, where it is further provided above said belt pulley with a suspended idle roller that comes to abut the belt when the belt is wound around said belt pulley to a given thickness.

6. A part holder unit according to claim 2, wherein said holding means comprises a clip.

7. A part holder unit according to claim 2, wherein said holding means comprises a hanger.

8. A part holder unit according to claim 1, wherein said spring comprises a spiral spring.

9. A part holder unit according to claim 1, wherein said spring comprises a coil spring.

10. A suspended belt-type expandable and movable part holder unit for a track conveyor system, comprising:
 a housing;
 means for supporting said housing for movement along a track of the track conveyor system;
 a horizontal shaft supported by said housing;
 a pulley rotatably mounted on said shaft, said pulley having a pair of flanges, one of said flanges forming a ratchet;
 a belt wound on said pulley between said flanges;
 a ring-shaped spring disposed in said pulley so as to bias rotation of said pulley in a direction that winds the belt around said pulley;
 a pawl pivotally mounted to said housing so as to be swingable into engagement with said ratchet; and
 release means, pivotally mounted to said housing, for releasing the engagement of said pawl with said ratchet.

11. A part holder unit according to claim 10, wherein said housing includes two spaced apart vertically parallel plates, opposite ends of said shaft being held by said plates, said pawl and said release means both being pivotally mounted to one of said two plates.

12. A part holder unit according to claim 10, wherein said spring comprises a spiral spring having opposite ends connected respectively to said pulley and said shaft.

13. A part holder unit according to claim 10, wherein said spring comprises a coil spring having opposite ends connected respectively to said pulley and said shaft.

* * * * *